(12) United States Patent
Pan (10) Patent No.: US 11,686,445 B1
(45) Date of Patent: Jun. 27, 2023

(54) MULTI-BRANCH CONDUCTIVE ROTARY MECHANISM WITH LOW COST

(71) Applicant: Yuan Pan, Shenzhen (CN)

(72) Inventor: Yuan Pan, Shenzhen (CN)

( * ) Notice: Subject to any disclaimer, the term of this patent is extended or adjusted under 35 U.S.C. 154(b) by 0 days.

(21) Appl. No.: 18/109,979

(22) Filed: Feb. 15, 2023

(30) Foreign Application Priority Data

Jan. 9, 2023 (CN) .......................... 202310023682.7

(51) Int. Cl.
| | |
|---|---|
| *F21S 10/00* | (2006.01) |
| *F21V 14/06* | (2006.01) |
| *F21V 19/02* | (2006.01) |
| *F21V 23/06* | (2006.01) |
| *F21V 14/02* | (2006.01) |
| *F21Y 115/10* | (2016.01) |

(52) U.S. Cl.
CPC ............ *F21S 10/007* (2013.01); *F21V 14/02* (2013.01); *F21V 14/06* (2013.01); *F21V 19/02* (2013.01); *F21V 23/06* (2013.01); *F21Y 2115/10* (2016.08)

(58) Field of Classification Search
CPC ......... F21S 10/007; F21S 10/00; F21V 14/02; F21V 14/06; F21V 19/02; F21V 23/06; F21V 14/00; F21V 14/065; F21V 5/00; F21V 5/008; F21Y 2115/10; F21L 15/02; G03B 21/00; G03B 21/20; G03B 21/142
See application file for complete search history.

(56) References Cited

U.S. PATENT DOCUMENTS

| | | | | |
|---|---|---|---|---|
| 10,072,824 | B1* | 9/2018 | Xiong | F21V 5/00 |
| 10,440,308 | B2* | 10/2019 | Xi | F21V 9/08 |
| 11,118,753 | B1* | 9/2021 | Zheng | F21V 33/0056 |
| 11,281,083 | B1* | 3/2022 | Xin | G03B 21/145 |
| 11,435,060 | B1* | 9/2022 | Zhang | F21V 17/02 |
| 2017/0219176 | A1* | 8/2017 | Chang | A63J 5/025 |
| 2019/0129284 | A1* | 5/2019 | Xi | G03B 23/105 |
| 2021/0247039 | A1* | 8/2021 | Zheng | F21V 5/04 |

* cited by examiner

*Primary Examiner* — Bao Q Truong
(74) *Attorney, Agent, or Firm* — Daniel M. Cohn; Howard M. Colin (57) ABSTRACT

A multi-branch conductive rotary mechanism with low cost includes a main body and a rotating shell configured to axially rotate with respect to the main body. A drive motor and a rotating connector are arranged inside the main body, and the rotating connector is driven by the drive motor to synchronously rotate. The rotating connector is connected to the rotating shell, and the rotating connector is configured to drive the rotating shell to synchronously rotate. The multi-branch conductive rotary mechanism further includes at least one external connector arranged on an outside of the rotating shell, and a projection lamp assembly. The at least one external connector is configured to be connected to external functional components. The projection lamp assembly is arranged on an inside or an outside of the main body.

10 Claims, 4 Drawing Sheets

MULTI-BRANCH CONDUCTIVE ROTARY MECHANISM WITH LOW COST

TECHNICAL FIELD

The subject matter herein generally relates to a technical field of rotary luminous colorful products, and in particular to a multi-branch conductive rotary mechanism with low cost and an outstanding application effect.

BACKGROUND

Projection lamps are lamp products that an LED light source projects a pattern printed on a lampshade and a film, onto a wall to form a projection pattern. Conventional projection lamp uses a motor to drive the entire projection lamp to rotate, so that the pattern projected on the wall achieves a rotation effect. The projection lamp with above structure is bulky, and consumes a lot of power, and performance of the projection lamp is not stable enough, function of the projection lamp is relatively single, and user experience of the projection lamp is poor.

For example, a Chinese Patent having an application number CN201520337079.7 and a patent name "A Rotary Projector Lamp", specifically protects a rotary projector lamp. The rotary projector lamp includes a base, a power supply, a geared motor, an LED lamp, and a projection lampshade. A battery box is set on the base, and a power supply is set in the battery box. A surface of the battery box is provided with a motor base, and the geared motor is set in the motor base, and a rotating rod is set on the geared motor. A printed circuit board (PCB) is set on a surface of the geared motor, and multiple LED lights are set on the PCB. A projection lampshade is placed on the rotating rod. The projection lampshade provides a transparent pattern around an inner wall surface. In the patent, a decorative shell is set on an outer surface of the rotary projector lamp, and the decorative shell is relatively independent from the base, and the decorative shell can be changed and matched according to requirements. The patent can not only achieve an effect of rotating projection, but also reduce power consumption and improve working performance.

For another example, a Chinese Patent having an application number CN202020358169.5 and a patent name "A Dynamic Projector Lamp", specifically protects a dynamic projection lamp. The dynamic projection lamp includes a base, an illuminant arranged on the base, and a projection film layer. The base also provides a grating layer, a dynamic film layer, and a rotary driving device. The grating layer and the dynamic film layer can be relatively rotated by a drive of the rotary drive device, and the dynamic film layer sets a pattern matching a grating of the grating layer. Through adopting the above-mentioned technical solution, the dynamic projection lamp of the patent is provided with the grating layer and the dynamic film layer which can rotate relatively on the base, and the dynamic film layer is provided with the pattern matched with the grating of the grating layer, therefore, when using the dynamic projection lamp, the rotating drive device drives the grating layer and the dynamic film layer to rotate with respect to each other, to provide a dynamic pattern display effect, increasing viewing and interest of the projection lamp.

However, the projection lamp products in the prior art, especially the rotary projection lamp products, each generally simply uses a rotating drive mechanism, such as a motor, to drive the lamp to rotate, so as to achieve an effect of rotating a projection screen, which is poor in user experience poor, relatively single in function, can not be applied to more occasions, and has relatively large limitations.

Based on above content, it is necessary to further improve an existing design of the projection lamp product.

SUMMARY

A problem existing in the prior art that the present disclosure solves is as following.

The projection lamp products in the prior art, especially the rotary projection lamp products, each generally simply uses a rotating drive mechanism, such as a motor, to drive the lamp to rotate, so as to achieve an effect of rotating a projection screen, which is poor in user experience poor, relatively single in function, can not be applied to more occasions, and has relatively large limitations.

A scheme that the present disclosure solves the above technical problem illustrates as follow.

The present disclosure provides a multi-branch conductive rotary mechanism with low cost, including a main body and a rotating shell configured to axially rotate with respect to the main body, wherein a drive motor and a rotating connector are arranged inside the main body, and the rotating connector is driven by the drive motor to synchronously rotate.

The rotating connector is connected to the rotating shell, and the rotating connector is configured to drive the rotating shell to synchronously rotate.

The multi-branch conductive rotary mechanism further includes at least one external connector arranged on an outside of the rotating shell, and the at least one external connector is configured to be connected to external functional components.

The multi-branch conductive rotary mechanism further includes a projection lamp assembly, and the projection lamp assembly is arranged on an inside or an outside of the main body, the projection lamp assembly includes a first lens sheet, a second lens sheet, an LED lamp board and a film sheet.

An output shaft of the drive motor is connected to the first lens sheet for driving the first lens sheet to axially rotate.

In one embodiment, a driven gear mechanism is disposed in the inside of the main body, and the driven gear mechanism is matched with the output shaft of the drive motor.

A side of the driven gear mechanism with respect to the drive motor is matched with the rotating connector for a transmission between the drive motor and the rotating connector.

The output shaft of the drive motor is connected to a driving gear.

In one embodiment, the second lens sheet is located at a lower part of the first lens sheet, and the film sheet is located between the first lens sheet and the second lens sheet.

Through holes for passing through the output shaft of the driving motor are defined on the second lens sheet and the film sheet.

In one embodiment, the driven gear mechanism includes a first driven gear matched with the driving gear of the drive motor and a second driven gear matched with the rotating connector, the first driven gear is coaxially connected to the second driven gear.

In one embodiment, the multi-branch conductive rotary mechanism further includes a film fixing plate for setting the film sheet, and a film cover covering a top part of the film sheet. A mounting groove for embedding and placing the film sheet is defined on the film fixing plate;

The multi-branch conductive rotary mechanism further includes a projection lamp holder for setting the second lens sheet and the LED lamp board, an insertion hole for inserting the film fixing plate and the film cover plate is defined on one side of the projection lamp holder;

The mounting groove of the film fixing plate is integrally formed with a limit post for limiting a position of the film sheet, lens holes with respect to a lens unit of the second lens sheet are respectively defined on the film fixing plate and the film cover plate.

In one embodiment, the rotating connector includes a connecting column and a rotating gear, the rotating gear is fixedly connected to the connecting column, the second driven gear is matched with the rotating gear, and the rotating connector is connected to the rotating shell by a plurality of screws.

The rotating shell is matched with the main body, and the rotating shell is located on an upper part of the main body, the main body and the rotating shell are jointly enclosed to form an internal space for installing the driving motor and the rotating connector.

In one embodiment, the output shaft of the drive motor is coaxially connected to an extension shaft, a first end of the extension shaft is connected to the output shaft of the drive motor, and a second end of the extension shaft passes through the second lens sheet and is connected to the first lens sheet. The LED lamp board is located at a lower part of the second lens sheet, the first lens sheet, the second lens sheet, and the LED lamp board correspond to each other in a vertical direction.

Strip-shaped limiting grooves are respectively defined on the film fixing plate, the film sheet, and the film cover plate for gradually moving the extension shaft into the strip-shaped limiting grooves for position limitation when the film fixing plate and the film cover plate are inserted into the insertion hole of the projection lamp holder;

The main body is connected to the projection lamp holder by a connecting rod, a handle is arranged on one end of the main body with respect to the projection lamp holder, the handle is configured to hang on an external object.

In one embodiment, a rotating support rod of the rotating connector is arranged in the inside of the main body, and the rotating support rod is configured to install the rotating connector, a lower part of the rotating support rod is connected to an inner side of the main body, and an upper part of the rotating support rod extends upwards for installing the rotating rod of the rotating connector.

The external functional components include string lights, laser lights, small toys and/or flashing five-pointed star.

In one embodiment, an upper part of the rotating shell is connected to a rotating frame, where the rotating frame synchronously rotates, a rotating bin is arranged on an upper part of the rotating frame, the projection lamp holder is located on an upper part of the rotating bin, a conductive slip ring mechanism for conducting electrical conduction is arranged inside the rotating bin, the conductive slip ring mechanism includes a positive conductive copper ring, a negative conductive copper ring, a positive conductive copper sheet matched with the positive conductive copper ring, and a negative conductive copper sheet matched with the negative conductive copper ring; the positive conductive copper ring, the positive conductive copper sheet, the negative conductive copper sheet and the negative conductive copper ring are arranged inside the rotating bin; an end of the positive conductive copper sheet and an end of the negative conductive copper sheet extend out of the rotating bin after passing through the rotary bin for electrically connecting with the external functional components.

In one embodiment, an inner side of the positive electrode conductive copper sheet is in contact with the positive conductive copper ring, an inner side of the negative conductive copper sheet is in contact with the negative conductive copper ring for electrical conduction; an isolation ring is arranged between the positive conductive copper ring and the negative conductive copper ring;

The positive conductive copper sheet and the negative electrode conductive copper sheet have a same structure, the positive conductive copper sheet includes an external conducting portion protruding from the rotating bin, and a copper ring contact portion in contact with the positive conductive copper ring;

A slot is defined on an outer wall of the rotating bin for snapping in the end of the positive conductive copper sheet and the end of the negative conductive copper sheet.

The copper ring contact portion is bent in an arc shape, and the copper ring contact portion protrudes toward the positive conductive copper ring and the negative conductive copper ring.

Technical effects produced by present disclosure to solve the technical problem are as follows.

Compared with the existing technology, the multi-branch conductive rotary mechanism with low cost of the present disclosure simultaneously arranges the main body and the rotating shell that can axially rotate with respect to the main body, the drive motor and the rotating connector driven by the drive motor to synchronously rotate, are arranged inside the main body, the rotating connector is connected to the rotating shell for driving the rotating shell rotates synchronously. The multi-branch conductive rotary mechanism with low cost further includes at least one external connector arranged on the outside of the rotating shell. The external connector is configured to be connected to the external functional components. The external connecting connector can be the structure, such as a connecting rod, an engaging block, a bonding piece, etc., as long as the components are able to connect the external functional components, and the components are able to make the external functional components fixed on the outside of the rotating shell, are all equivalent technical solutions of the external connector. The present disclosure further includes a projection lamp assembly arranged on the inside or outside of the main body. The projection lamp assembly includes the first lens sheet, the second lens sheet, the LED lamp board and the film sheet. The output shaft of the drive motor is connected to the first lens sheet for driving the first lens sheet to axially rotate. In actual application process, the external functional components are connected to the external connector, and a synchronous rotation is realized under the drive of the rotating shell, and a colorful projection effect is achieved combined with the projection lamp assembly, thus further improving product versatility, and enhancing the user experience.

BRIEF DESCRIPTION OF THE DRAWINGS

Implementations of the present disclosure will now be described, by way of example only, with reference to the attached figures.

REFERENCE NUMBER

11: handle; 12: main body; 121: drive motor; 123: driving gear; 124: first driven gear; 125: second driven gear; 126: lower part of the rotating support rod; 127: upper part of the rotating support rod; 13: rotating shell; 14: rotating frame; 141: external connector; 142: rotating bin; 15: rotating connector; 151: rotating gear; 16: conductive slip ring mechanism; 161: positive conductive copper ring; 164: negative conductive copper ring; 162: positive conductive copper sheet; 163: negative conductive copper sheet; 17: projection lamp holder; 171: insertion hole; 181: film fixing plate; 1811: mounting groove; 182: film sheet; 183: film cover plate; 191: first lens sheet; 192: second lens sheet; 193: LED lamp board; 194: extension shaft.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein can be practiced without these specific details. In other instances, methods, procedures, and components have not been described in detail so as not to obscure the related relevant feature being described. The drawings are not necessarily to scale and the proportions of certain parts may be exaggerated to better illustrate details and features. The description is not to be considered as limiting the scope of the exemplary embodiments described herein.

The term "comprising" means "including, but not necessarily limited to"; it specifically indicates open-ended inclusion or membership in a so-described combination, group, series and the like.

In order to make objects, technical solutions and advantages of the present disclosure clearer, the present disclosure will be further described in detail below in conjunction with accompanying drawings and embodiments. It should be understood that the specific embodiments described here are only configured to explain the present disclosure, and are not intended to limit the present disclosure.

Referring to FIGS. 1-4, the multi-branch conductive rotary mechanism 1 with low cost of the present disclosure includes a main body 12 and a rotating shell 13. The rotating shell is able to axially rotate with respect to the main body 12. A drive motor 121 and a rotating connector 15 are arranged inside the main body 12. The rotating connector 15 is driven by the drive motor 121 to synchronously rotate.

Figure 1:
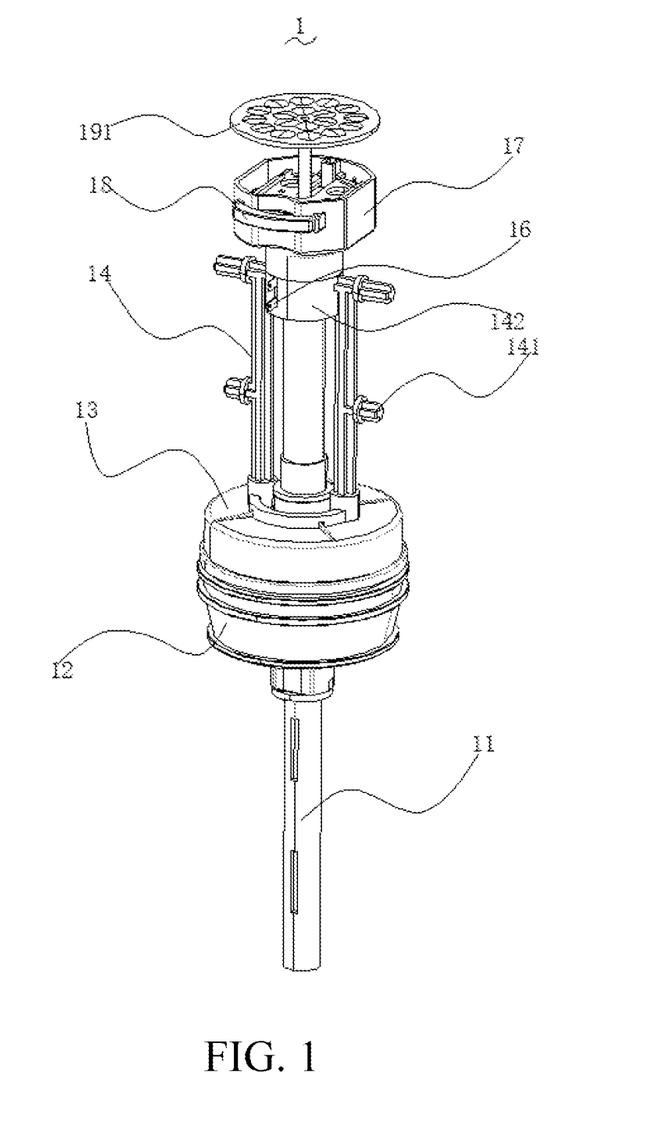
FIG. 1 is a three-dimensional structural schematic diagram of an exemplary embodiment of a multi-branch conductive rotary mechanism with low cost.
Figure 2:
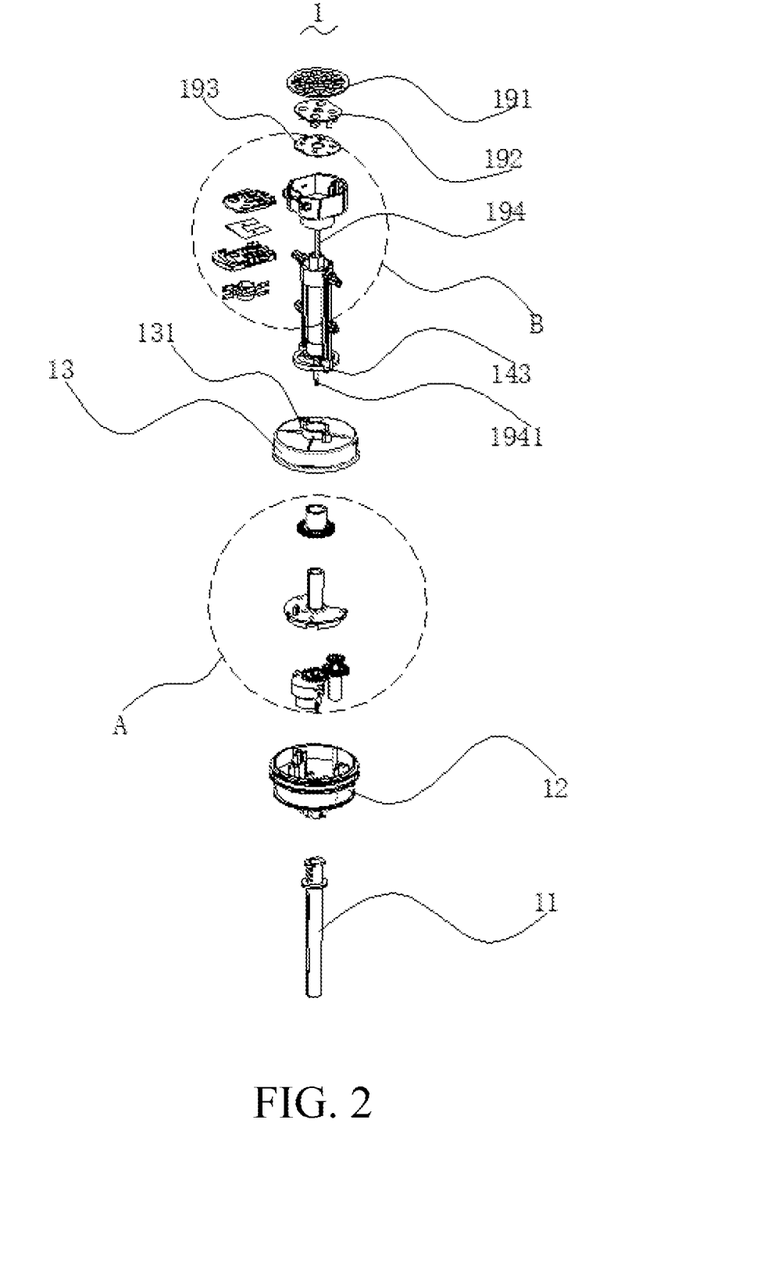
FIG. 2 is an exploded structural schematic diagram of an exemplary embodiment of the multi-branch conductive rotary mechanism with low cost.

The rotating connector 15 is connected to the rotating shell 13, and the rotating connector 15 is configured to drive the rotating shell 13 to synchronously rotate.

The multi-branch conductive rotary mechanism 1 with low cost further includes at least one external connector 141 arranged on an outside of the rotating shell 13. The external connector 141 is configured to be connected to external functional components. The external connecting connector 141 can be a structure such as a connecting rod, an engaging block, a bonding piece, etc., as long as components are able to connect the external functional components, and the components are able to make the external functional components fixed on the outside of the rotating shell 13, are all equivalent technical solutions of the external connector.

The multi-branch conductive rotary mechanism 1 with low cost further includes a projection lamp assembly. And the projection lamp assembly is arranged on the inside or outside of the main body 12. The projection lamp assembly includes a first lens sheet 191, a second lens sheet 192, an LED lamp board 193 and a film sheet 182.

An output shaft of the drive motor 121 is connected to the first lens sheet 191 for driving the first lens sheet 191 to axially rotate.

The present disclosure simultaneously arranges the main body 12 and the rotating shell 13 that can axially rotate with respect to the main body 12, the drive motor 121 and the rotating connector 15 driven by the drive motor 121 to synchronously rotate, are set inside the main body 12, the rotating connector 15 is connected to the rotating shell 13 for driving the rotating Shell 13 rotates synchronously. The present disclosure further includes at least one external connector 141 arranged on the outside of the rotating shell 13. The external connector 141 is configured to be connected to external functional components. The external connecting connector 141 can be the structure such as a connecting rod, an engaging block, a bonding piece, etc., as long as the components are able to connect the external functional components, and the components are able to make the external functional components fixed on the outside of the rotating shell 13, are all equivalent technical solutions of the external connector. The present disclosure further includes a projection lamp assembly arranged on the inside or outside of the main body 12. The projection lamp assembly includes the first lens sheet 191, the second lens sheet 192, the LED lamp board 193 and the film sheet 182. The output shaft of the drive motor 121 is connected to the first lens sheet 191 for driving the first lens sheet 191 to axially rotate. In actual application process, the external functional components are connected to the external connector 141, and a synchronous rotation is realized under the drive of the rotating shell 13, a colorful projection effect is achieved combined with the projection lamp assembly, thus further improving a product versatility of the multi-branch conductive rotary mechanism 1 with low cost, and enhancing the user experience.

In some other embodiments, the inside of the main body 12 arranges a driven gear mechanism matched with the output shaft of the drive motor 121.

A side of the driven gear mechanism with respect to the drive motor 121 is matched with the rotating connector 15 for a transmission between the drive motor 121 and the rotating connector 15.

The output shaft of the drive motor 121 is connected to a driving gear 123.

In one embodiment, the second lens sheet 192 is located at a lower part of the first lens sheet 191, and the film sheet 182 is located between the first lens sheet 191 and the second lens sheet 192.

Through holes for passing through the output shaft of the driving motor 121 are defined on the second lens sheet 192 and the film sheet 182.

In order to carry out gear meshing connection transmission, the driven gear mechanism includes a first driven gear 124 that is matched with the driving gear 123 of the drive motor 121, and a second driven gear that is matched with the rotating connector 15. The first driven gear 124 is coaxially connected to the second driven gear 125.

In a film mechanism part, the multi-branch conductive rotary mechanism 1 with low cost further includes a film fixing plate 181 for setting the film sheet 182, and a film cover 183 covering a top part of the film sheet 182. A mounting groove 1811 for embedding and placing the film sheet 182 is defined on the film fixing plate 181. A shape of the mounting groove 1811 matches a shape of the film sheet 182.

In actual use, light emitted by a light source of the LED lamp board 193 is condensed by a condenser lens group (second lens sheet 192), and then the light is provided to the film sheet 182, and then the light passes through an imaging lens group (first lens sheet 191), which can then be projected outward.

The multi-branch conductive rotary mechanism 1 with low cost further includes a projection lamp holder 17 for setting the second lens sheet 192 and the LED lamp board 193. An insertion hole 171 for inserting the film fixing plate 181 and the film cover plate 183 is defined on one side of the projection lamp holder 17.

The mounting groove 1811 of the film fixing plate 181 is also integrally formed with a limit post for limiting a position of the film sheet 182. Lens holes with respect to a lens unit of the second lens sheet 192 are defined on the film fixing plate 181 and the film cover plate 183.

In some other embodiments, in order to carry out relatively stable gear transmission, the rotating connector 15 includes a connecting column and a rotating gear 151. The rotating gear 151 is fixedly connected to the connecting column. The second driven gear 125 is matched with the rotating gear 151, and the rotating connector 15 is connected to the rotating shell 13 by a number of screws.

The rotating shell 13 is matched with the main body 12, and the rotating shell 13 is located on an upper part of the main body 12. The main body 12 and the rotating shell 13 are jointly enclosed to form an internal space for installing the driving motor 121 and the rotating connector 15.

In one embodiment, the output shaft of the drive motor 121 is coaxially connected to an extension shaft 194. A first end of the extension shaft 194 is connected to the output shaft of the drive motor 121, a screw post 1941 is arranged on one end of the extension shaft 194, and the one end faces the drive motor 121, and a second end of the extension shaft 194 passes through the second lens sheet 192 and is connected to the first lens sheet 191. The LED lamp board 193 is located at a lower part of the second lens sheet 192. The first lens sheet 191, the second lens sheet 192, and the LED lamp board 193 correspond to each other in a vertical direction.

Strip-shaped limiting grooves are respectively defined on the film fixing plate 181, the film sheet 182 and the film cover plate 183 for gradually moving the extension shaft 194 into the strip-shaped limiting grooves for position limitation when the film fixing plate 181 and the film cover plate 182 are inserted into the insertion hole 171 of the projection lamp holder 17.

The main body 12 is connected to the projection lamp holder 17 by a connecting rod. A handle 11 is arranged on an end of the main body 12 with respect to the projection lamp holder 17. The handle 11 is configured to hang on an external object.

In order to better install the rotating connector 15, a rotating support rod of the rotating connector 15 is arranged in the inside of the main body 12, and the rotating support rod is configured to install the rotating connector 15. The lower part 126 of the rotating support rod is connected to an inner side of the main body 12, and an upper part 127 of the rotating support rod extends upwards for installing the rotating rod of the rotating connector 15.

The external functional components include string lights, laser lights, small toys and/or flashing five-pointed star.

Figure 3:
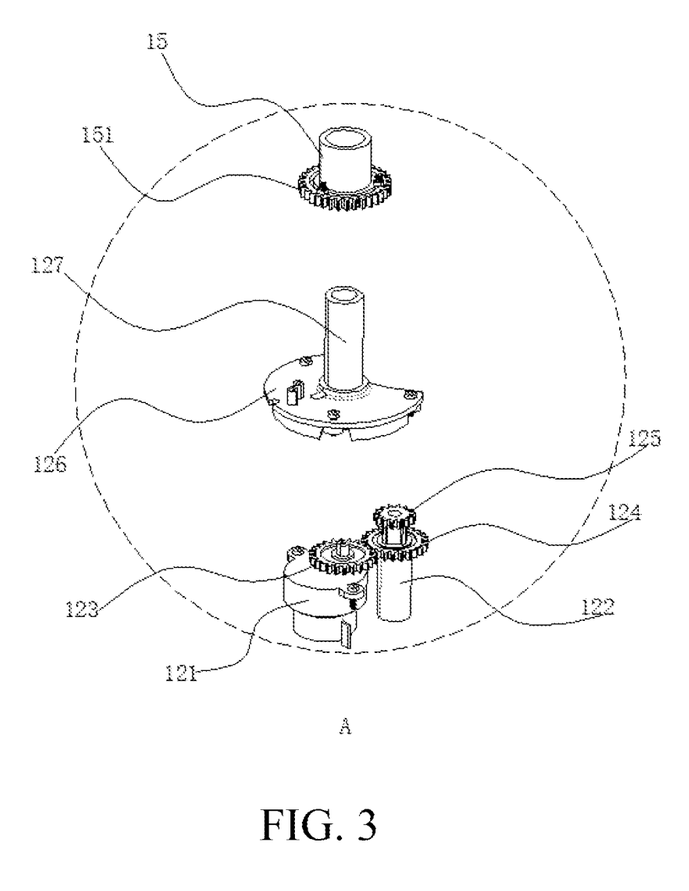
FIG. 3 is a schematic diagram of an enlarged view of an exemplary embodiment of portion A shown in FIG. 2.
Figure 4:
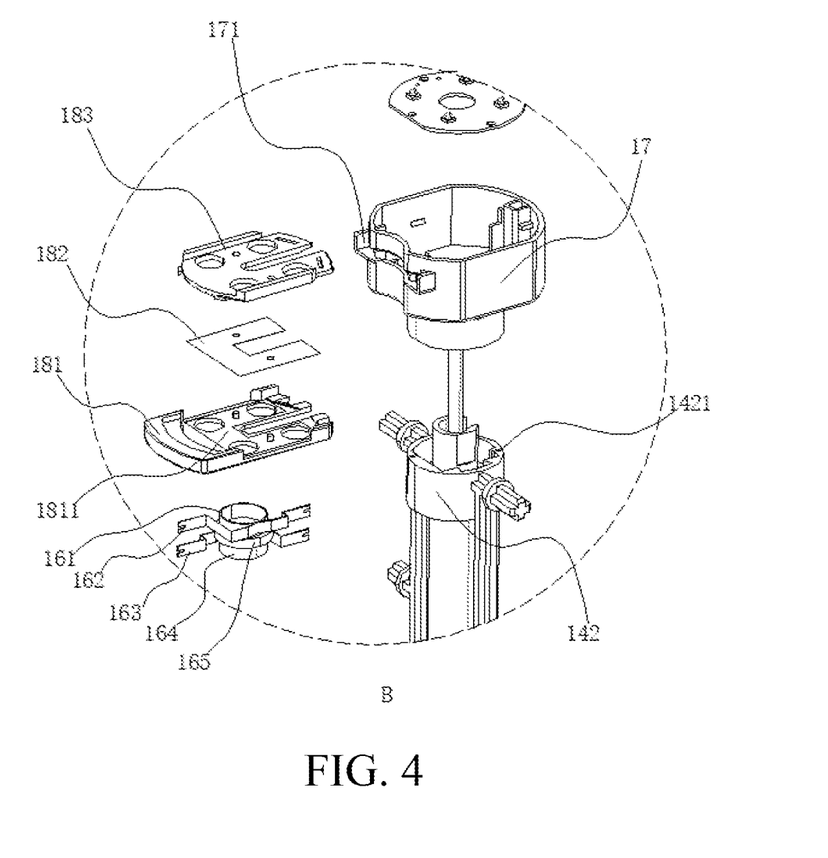
FIG. 4 is a schematic diagram of an enlarged view of an exemplary embodiment of portion B shown in FIG. 2.

The present disclosure adopts an anti-winding conductive slip ring mechanism in the power supply part of the external functional components, and an upper part of the rotating shell 13 is connected to a rotating frame 14 that rotates synchronously. The external connector 141 can be arranged on the rotating frame 14, and an upper part of the rotating frame 14 arranges a rotating bin 142. The projection lamp holder 17 is located on the upper part of the rotating bin 142. A conductive slip ring mechanism 16 for conducting electrical conduction is also arranged inside the rotating bin 142. The conductive slip ring mechanism 16 includes a positive conductive copper ring 161, a negative conductive copper ring 164, a positive conductive copper sheet 162 matched with the positive conductive copper ring 161, and a negative conductive copper sheet 163 matched with the negative conductive copper ring 164. The positive conductive copper ring 161, the positive conductive copper sheet 162, the negative conductive copper sheet 163 and the negative conductive copper ring 164 are in an inner side of the rotating bin 142. An end of the positive conductive copper sheet 162 and an end of the negative conductive copper sheet 163 extend out of the rotating bin 142 after passing through the rotary bin 142 for electrical connection with the external functional components.

An inner side of the positive electrode conductive copper sheet 162 is in contact with the positive conductive copper ring 161. An inner side of the negative conductive copper sheet 163 is in contact with the negative conductive copper ring 164 for electrical conduction. An isolation ring 165 is arranged between the positive conductive copper ring 161 and the negative conductive copper ring 164.

The positive conductive copper sheet 162 and the negative electrode conductive copper sheet 163 have a same structure. The positive conductive copper sheet 162 includes an external conducting portion protruding from the rotating bin 142, and a copper ring contact portion in contact with the positive conductive copper ring 161.

A slot 1421 is defined on an outer wall of the rotating bin 142 for snapping in the end of the positive conductive copper sheet 162 and the end of the negative conductive copper sheet 163.

The copper ring contact portion is bent in an arc shape, and the copper ring contact portion protrudes toward the positive conductive copper ring 161 and the negative conductive copper ring 164 to form a protruding structure. A design of the protruding structural is to make the copper ring contact portion more reliable and tightly contact with the positive conductive copper ring 161 and the negative conductive copper ring 164.

The technical effects produced by the present disclosure to solve the technical problems are as follows.

Compared with the existing technology, the multi-branch conductive rotary mechanism 1 with low cost of the present disclosure simultaneously arranges the main body 12 and the rotating shell 13 that can axially rotate with respect to the main body 12, the drive motor 121 and the rotating connector 15 driven by the drive motor 121 to synchronously rotate, are arranged inside the main body 12, the rotating connector 15 is connected to the rotating shell 13 for driving the rotating Shell 13 rotates synchronously. The multi-branch conductive rotary mechanism 1 with low cost further includes at least one external connector 141 arranged on the outside of the rotating shell 13. The external connector 141 is configured to be connected to the external functional components. The external connecting connector 141 can be the structure such as a connecting rod, an engaging block, a bonding piece, etc., as long as the components are able to connect the external functional components, and the components are able to make the external functional components fixed on the outside of the rotating shell 13, are all equivalent technical solutions of the external connector. The present disclosure further includes a projection lamp assembly arranged on the inside or outside of the main body 12. The projection lamp assembly includes the first lens sheet 191, the second lens sheet 192, the LED lamp board 193 and the film sheet 182. The output shaft of the drive motor 121 is connected to the first lens sheet 191 for driving the first lens sheet 191 to axially rotate. In actual application process, the external functional components are connected to the external connector 141, and a synchronous rotation is realized under the drive of the rotating shell 13, and a colorful projection effect is achieved combined with the projection lamp assembly, thus further improving a product versatility, and enhancing the user experience.

The embodiments of the present disclosure described above do not constitute a limitation to a protection scope of the present disclosure. Any modifications, equivalent replacements and improvements made within the spirit and principles of the present disclosure shall be included within the protection scope of the claims of the present disclosure.

What is claimed is:

1. A multi-branch conductive rotary mechanism with low cost, comprising:
    a main body; and
    a rotating shell;
    wherein the rotating shell is configured to axially rotate with respect to the main body, a drive motor and a rotating connector are arranged inside the main body, and the rotating connector is driven by the drive motor to synchronously rotate;
    the rotating connector is connected to the rotating shell, and the rotating connector is configured to drive the rotating shell to synchronously rotate;
    the multi-branch conductive rotary mechanism further comprises at least one external connector arranged on an outside of the rotating shell, and the at least one external connector is configured to be connected to external functional components;
    the multi-branch conductive rotary mechanism further comprises a projection lamp assembly, and the projection lamp assembly is arranged on an inside or an outside of the main body, the projection lamp assembly comprises a first lens sheet, a second lens sheet, an LED lamp board, and a film sheet; and
    an output shaft of the drive motor is connected to the first lens sheet for driving the first lens sheet to axially rotate.

2. The multi-branch conductive rotary mechanism with low cost as recited in claim 1, wherein a driven gear mechanism is disposed in the inside of the main body, and the driven gear mechanism is matched with the output shaft of the drive motor;
    a side of the driven gear mechanism with respect to the drive motor is matched with the rotating connector for a transmission between the drive motor and the rotating connector; and
    the output shaft of the drive motor is connected to a driving gear.

3. The multi-branch conductive rotary mechanism with low cost as recited in claim 1, wherein the second lens sheet is located at a lower part of the first lens sheet, and the film sheet is located between the first lens sheet and the second lens sheet; and
    through holes for passing through the output shaft of the driving motor are defined on the second lens sheet and the film sheet.

4. The multi-branch conductive rotary mechanism with low cost as recited in claim 2, wherein the driven gear mechanism comprises a first driven gear matched with the driving gear of the drive motor and a second driven gear matched with the rotating connector; the first driven gear is coaxially connected to the second driven gear.

5. The multi-branch conductive rotary mechanism with low cost as recited in claim 3, wherein the multi-branch conductive rotary mechanism further comprises a film fixing plate for setting the film sheet, and a film cover covering a top part of the film sheet; a mounting groove for embedding and placing the film sheet is defined on the film fixing plate;
    the multi-branch conductive rotary mechanism further comprises a projection lamp holder for setting the second lens sheet and the LED lamp board, an insertion hole for inserting the film fixing plate and the film cover plate is defined on one side of the projection lamp holder; and
    the mounting groove of the film fixing plate is integrally formed with a limit post for limiting a position of the film sheet, lens holes with respect to a lens unit of the second lens sheet are respectively defined on the film fixing plate and the film cover plate.

6. The multi-branch conductive rotary mechanism with low cost as recited in claim 4, wherein the rotating connector comprises a connecting column and a rotating gear, the rotating gear is fixedly connected to the connecting column, the second driven gear is matched with the rotating gear, and the rotating connector is connected to the rotating shell by a plurality of screws; and
    the rotating shell is matched with the main body, and the rotating shell is located on an upper part of the main body, the main body and the rotating shell are jointly enclosed to form an internal space for installing the driving motor and the rotating connector.

7. The multi-branch conductive rotary mechanism with low cost as recited in claim 5, wherein the output shaft of the drive motor is coaxially connected to an extension shaft, a first end of the extension shaft is connected to the output shaft of the drive motor, and a second end of the extension shaft passes through the second lens sheet and is connected to the first lens sheet; the LED lamp board is located at a lower part of the second lens sheet; the first lens sheet, the second lens sheet, and the LED lamp board correspond to each other in a vertical direction;
    strip-shaped limiting grooves are respectively defined on the film fixing plate, the film sheet, and the film cover plate for gradually moving the extension shaft into the strip-shaped limiting grooves for position limitation when the film fixing plate and the film cover plate are inserted into the insertion hole of the projection lamp holder; and
    the main body is connected to the projection lamp holder by a connecting rod, a handle is arranged on one end of the main body with respect to the projection lamp holder, the handle is configured to hang on an external object.

8. The multi-branch conductive rotary mechanism with low cost as recited in claim 1, wherein a rotating support rod of the rotating connector is arranged in the inside of the main body, and the rotating support rod is configured to install the rotating connector, a lower part of the rotating support rod is connected to an inner side of the main body, and an upper part of the rotating support rod extends upwards for installing the rotating rod of the rotating connector; and the external functional components comprise string lights, laser lights, small toys and/or flashing five-pointed star.

9. The multi-branch conductive rotary mechanism with low cost as recited in claim 5, wherein an upper part of the rotating shell is connected to a rotating frame, where the rotating frame synchronously rotates, a rotating bin is arranged on an upper part of the rotating frame, the projection lamp holder is located on an upper part of the rotating bin, a conductive slip ring mechanism for conducting electrical conduction is arranged inside the rotating bin, the conductive slip ring mechanism comprises a positive conductive copper ring, a negative conductive copper ring, a positive conductive copper sheet matched with the positive conductive copper ring, and a negative conductive copper sheet matched with the negative conductive copper ring; the positive conductive copper ring, the positive conductive copper sheet, the negative conductive copper sheet, and the negative conductive copper ring are arranged inside the rotating bin; an end of the positive conductive copper sheet and an end of the negative conductive copper sheet extend out of the rotating bin after passing through the rotary bin for electrically connecting with the external functional components.

10. The multi-branch conductive rotary mechanism with low cost as recited in claim 9, wherein an inner side of the positive electrode conductive copper sheet is in contact with the positive conductive copper ring, an inner side of the negative conductive copper sheet is in contact with the negative conductive copper ring for electrical conduction; an isolation ring is arranged between the positive conductive copper ring and the negative conductive copper ring;

the positive conductive copper sheet and the negative electrode conductive copper sheet have a same structure, the positive conductive copper sheet comprises an external conducting portion protruding from the rotating bin, and a copper ring contact portion in contact with the positive conductive copper ring;

a slot is defined on an outer wall of the rotating bin for snapping in the end of the positive conductive copper sheet and the end of the negative conductive copper sheet; and the copper ring contact portion is bent in an arc shape, and the copper ring contact portion protrudes toward the positive conductive copper ring and the negative conductive copper ring.

* * * * *